(12) United States Patent
Cosenza

(10) Patent No.: US 6,237,450 B1
(45) Date of Patent: May 29, 2001

(54) FASTENER SYSTEM WITH SPLINE RECESS AND DRIVING TOOL

(75) Inventor: Frank J. Cosenza, Santa Barbara, CA (US)

(73) Assignee: Fairchild Holding Corp., Dulles, VA (US)

( * ) Notice: Subject to any disclaimer, the term of this patent is extended or adjusted under 35 U.S.C. 154(b) by 0 days.

(21) Appl. No.: 09/301,018

(22) Filed: Apr. 28, 1999

(51) Int. Cl.[7] ........................................ F16B 23/00
(52) U.S. Cl. .................................. 81/436; 81/460
(58) Field of Search .................. 81/436, 460; 411/3, 411/5, 403–405, 919

(56) References Cited

U.S. PATENT DOCUMENTS

| | | | |
|---|---|---|---|
| 1,075,710 | * 10/1913 | Goodwin | 411/403 X |
| 3,285,119 | * 11/1966 | Dean et al. | 81/436 X |
| 3,584,667 | * 6/1971 | Reiland | 81/460 |
| 4,637,764 | * 1/1987 | Imai | 411/5 |
| 4,809,569 | * 3/1989 | Erb | 81/460 X |
| 5,088,869 | * 2/1992 | Greenslade | 411/386 |
| 5,279,190 | * 1/1994 | Goss et al. | 81/460 |
| 5,435,680 | * 7/1995 | Schuster | 81/460 X |
| 5,549,431 | * 8/1996 | Royle | 411/389 |
| 5,553,983 | * 9/1996 | Shinjo | 81/460 X |

* cited by examiner

Primary Examiner—Joseph J. Hail, III
Assistant Examiner—Anthony Ojini
(74) Attorney, Agent, or Firm—Christie, Parker & Hale, LLP

(57) ABSTRACT

An improved fastener system includes a threaded pin and a tool. The pin contains a recess in a threaded end of the pin for receiving the tool, thus holding the pin against rotation during application of a nut on the pin. The recess includes splines extending around a circumference of the recess. A plurality of mating splines are located on an end of the tool for engaging the slots of the recess. The splines are oriented to maximize torsional performance and to balance the shear strength of the pin with the shear strength of the tool. Additionally the ends of the recess splines and a minor diameter of the tool include a matching curved surface to increase torsional strength.

10 Claims, 4 Drawing Sheets

FASTENER SYSTEM WITH SPLINE RECESS AND DRIVING TOOL

FIELD OF THE INVENTION

The present invention relates generally to fastener systems, and more particularly, to a fastener system comprising a threaded fastener having a spline-drive recess for receiving a mating tool during application of a nut on the fastener.

BACKGROUND OF THE INVENTION

Threaded fasteners typically consist of a nut and a bolt. The nut has an internal thread that screws onto an external thread of the bolt. Wrenching surfaces on the nut and/or bolt accept wrenches that tightly join the fasteners and one or more workpieces together. The fastener secures workpieces together to form a joint by compressive engagement between the nut on one side of the workpiece, and the head of the bolt on the opposite side.

U.S. Pat. No. 4,260,005 describes a particular type of threaded fastener having a self-locking nut that uses external lobes to accept a driver having a generally triangular or deltoid shaped socket to tighten the nut on a cooperating pin. The teachings of this patent necessary for an understanding of the present invention are incorporated herein by this reference. The nut is preferably used with a pin having a plurality of grooves or flutes extending longitudinally along the pin. Once a predetermined axial load exists in the joint being made, the lobes plastically deform and the driver can no longer turn the nut. Deformation of the lobes displaces material positioned radially inward from them into the flutes of the cooperating pin to produce a mechanical thread lock. The thread lock results from material deforming into and across the pin flutes.

There are numerous applications where it is advantageous to provide a fastener which may be held against rotation from its leading edge while a nut is torqued upon the pin. For example, as is often the case in the aerospace industry, there are many requirements for "blind" bolt applications, where the head of the bolt cannot be conveniently reached, or is perhaps altogether unreachable for wrenching purposes. For these applications, a holding bit or tool is often provided with the driver. The bit engages a recess in the threaded end of the pin to facilitate application of the nut by the driver. The bit remains stationary, thus holding the pin against rotation, while the driver turns to torque the nut. U.S. Pat. Nos. 4,583,483 and 5,044,225 describe the use of such a bit or tool in connection with power tools developed for the rapid installation of fasteners.

Generally, a hexagonal recess is provided in the threaded end of bolts for receiving a matching hexagonal bit. Existing hexagonal bits, however, have experienced unacceptable failure rates when used during installation of bolts in certain wet-sealant applications. In these applications, sealant often surrounds the head of the bolt and is present between the bolt and the workpiece. As a result, all of the torque required to apply the nut to the pin is transferred directly to the bit, rather than being partially absorbed by the friction normally present between the head of the bolt and the workpiece. When the above induced torque exceeds the strength of the hexagonal bit, application of the nut becomes impossible.

Initial attempts at solving this problem included varying the cross-section and material of the hexagonal bit. However, these attempts have been largely unsuccessful due to radial loading for hexagonal recesses. Spline keys and drivers are known and have been used in many applications. When used in connection with fasteners, standard spline recesses and wrenching tools result in the splines in the fastener being sheared by the tool. Torque is transmitted from the mating spline of the tool to the spline of the recess. When resistance is achieved after seating the fastener, additional torquing can result in the shearing of the splined socket. Shearing results because standard spline design results in the wrenching drive tool being fabricated from a material that is usually stronger than the material of the fastener. Standard configurations results in the spline surface area of the wrenching tool being 7.9% to 38.5% greater than the spline surface area of the fastener socket's spline surface area. This coupled with the tool having a greater shear strength than the fastener's socket results in an unacceptable failure rate.

Consequently, a need exists for a spline drive socket/tool arrangement for fasteners that prevent unacceptable failure.

SUMMARY OF THE INVENTION

The present invention, therefore, provides an improved fastener system that minimizes the disadvantages identified with respect to the prior art fastener systems described above. The fastener system according to the present invention generally includes a threaded pin having a recess in an end face on the threaded portion of the pin for receiving a tool when a nut is torqued onto the pin. In a presently preferred embodiment, the recess comprises a newly designed spline socket extending into the end face. Additionally the tool comprises a plurality of mating splines extending from at least an end of the tool configured to match the recess such that the tool may be received in the recess to prevent the pin from rotating when the nut is torqued onto the pin.

The pin preferably includes a plurality of flutes extending in an axial direction across the threaded portion of the pin. Preferably, the nut includes at least one external, axially extending lobe. As a result, when the nut is torqued onto the pin, some of the material positioned radially inward from the lobe is displaced into the flutes of the pin.

In a presently preferred embodiment, the recess is a spline recess comprising six splines extending around the circumference of the recess. To engage the recess during torquing of the nut onto the pin, the tool is formed as a shaft with six splines extending around the circumference of the shaft and sized to cooperate with the recess splines. The tool prevents the pin of the fastener from rotating during application of the nut. The spline widths and shear areas of both the recess and the tool are formed so that torsional loading is equal for both the tool and the recess. An advantage of this design is that the strength of the recess is significantly enhanced which is particularly important in aerospace fasteners. This result is accomplished by forming the width of the splines to be larger in the socket than on the tool. By increasing the spline width on the recess (which is made from lower strength material) the shear area is increased. The shear area of the splines of the driving tool (which is made from higher strength material) is reduced so that it is in close balance strengthwise with that of the socket. The net result is a substantial increase in torsional performance since the tool will not overpower the socket.

The tool has also been designed to include a curved minor diameter. Typically the spline drivers included a minor diameter with a machined flat surface which results in loss of valuable torsional strength because of the removed material.

BRIEF DESCRIPTION OF THE DRAWINGS

These and other features and advantages of the present invention will be appreciated as the same become better understood by reference to the following Detailed Description when considered in connection with the accompanying drawings, wherein.

DETAILED DESCRIPTION OF THE INVENTION

Figure 1:
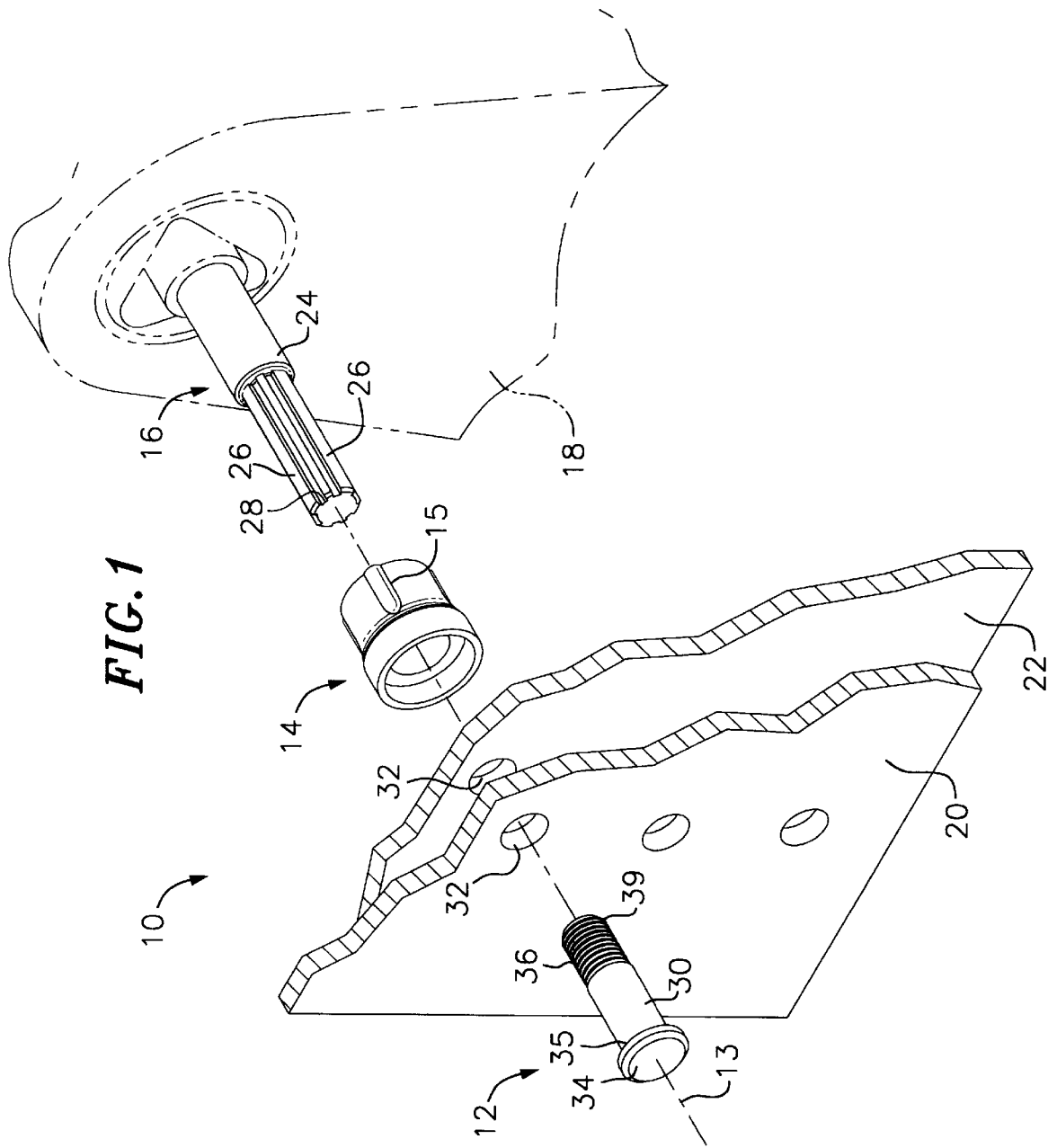
FIG. 1 is an exploded perspective view of the fastener system of the present invention.
Figure 2:
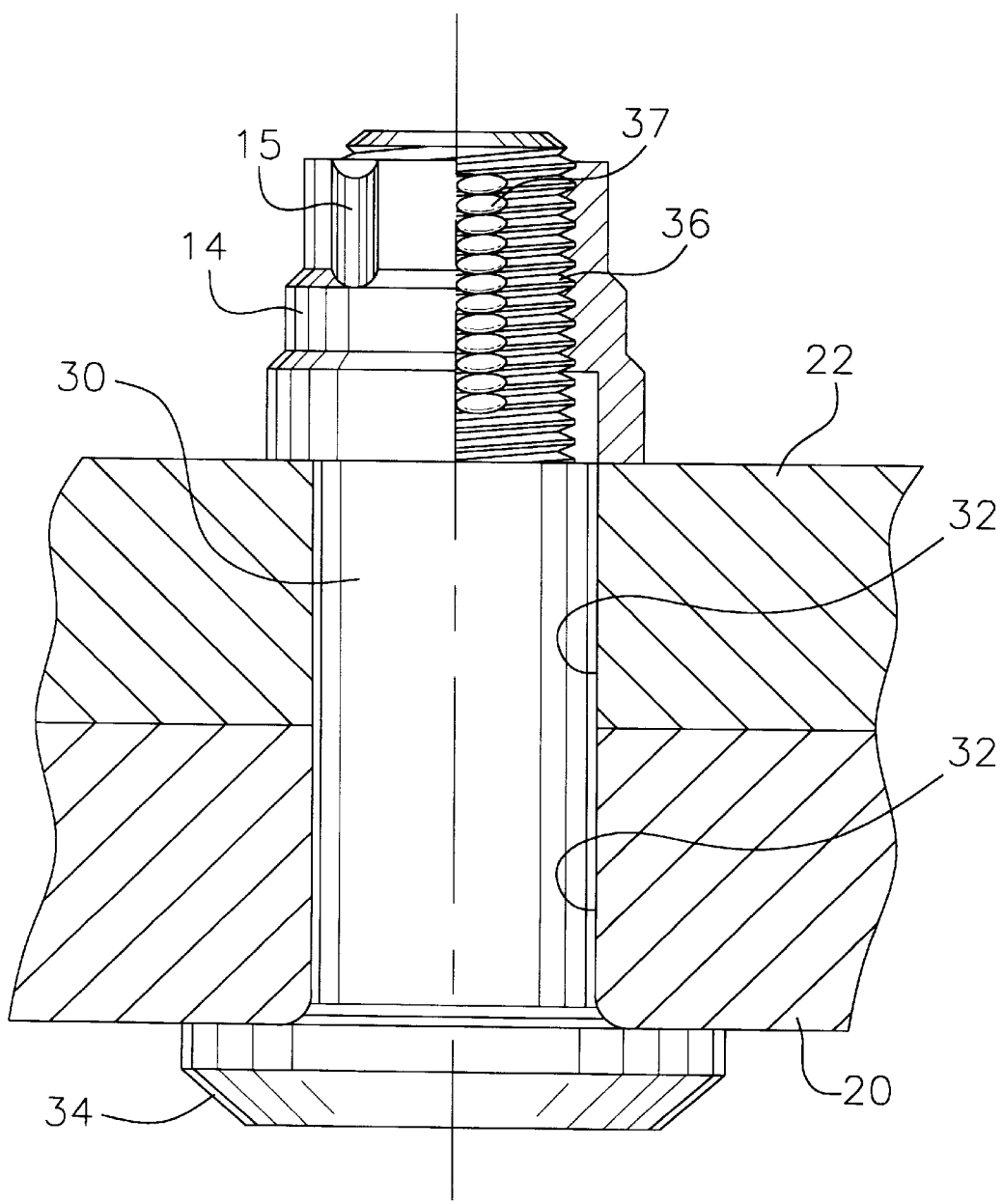
FIG. 2 is a front partial cross-sectional view of the fastener of FIG. 1.
Figure 3:
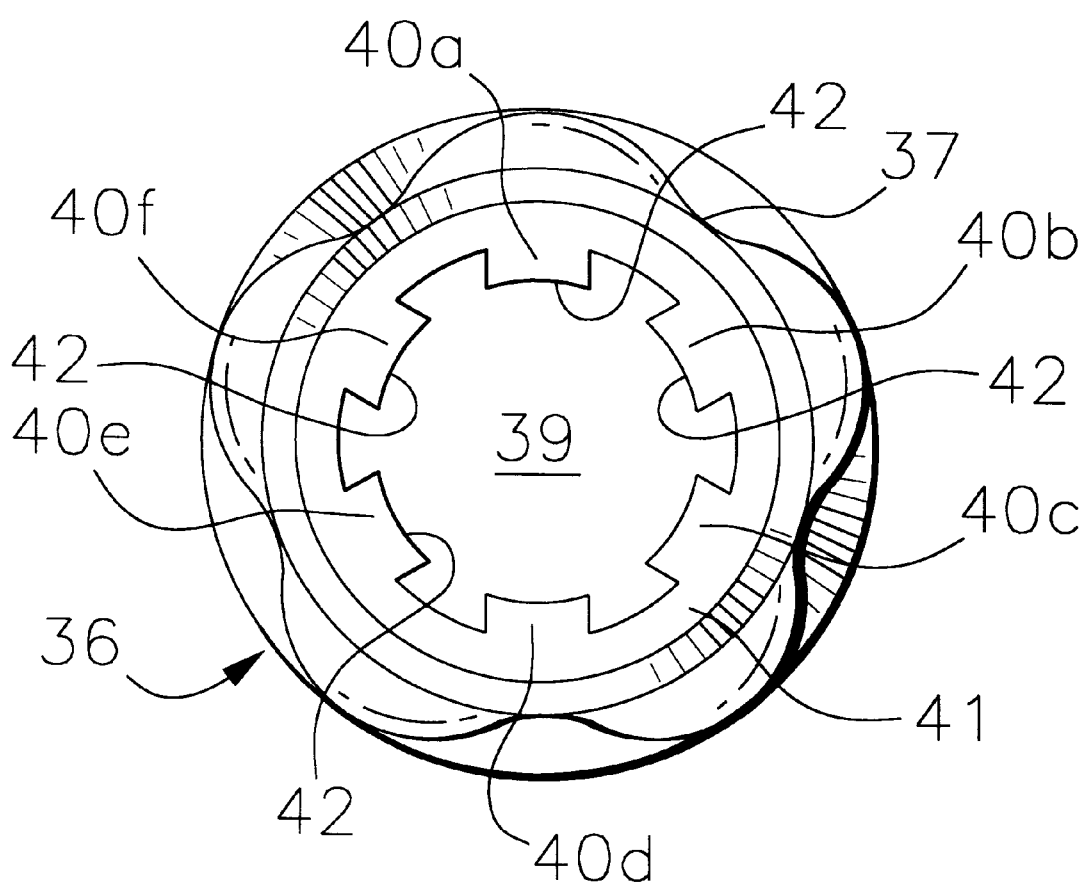
FIG. 3 is a end view of the threaded end of the pin of FIG. 2.

Referring now to FIGS. 1–3, a presently preferred embodiment of the fastener system 10 according to the present invention is generally illustrated. The fastener system includes a fastener, comprising a bolt or threaded pin 12, a nut 14, and a tool 16. The pin 12 and nut 14 have a common axis 13. A pair of sheets 20, 22 comprising a workpiece are secured together by the fastener. The fastener secures the sheets together, forming a joint by compressive engagement between the nut 14 on one side of the workpiece, and a head 34 of the pin 12 on the opposite side, when the nut is torqued onto the pin. A cylindrical bore passes through the nut 14, and the inner surface (not shown) of the nut defining the bore is threaded. The nut 14 preferably has a plurality of external, axially extending lobes 15, of which one is shown, integrally formed on the nut. The internal thread of the nut 14 is adapted to receive the threaded pin 12.

The pin 12 has a threaded portion 36, opposite the head 34. The threaded portion 36 preferably includes a plurality of flutes 37 having a generally concave curvature extending across the threads of the pin 12 in the axial direction. An end face 41 of the threaded end 36 of the pin includes a recess 39 for receiving the tool 16 to prevent rotation of the pin as the nut is torqued onto the pin by a driver 18 (illustrated in phantom in FIG. 1). During the setting of the fastener, the axial load applied between the bolt head and the nut increases up to a predetermined level. Once the predetermined axial load exists in the joint being made, the lobes 15 plastically deform into the flutes 37 of the pin to produce a mechanical thread lock.

The number of flutes provided on the pin relative to the number of lobes provided on the nut is preferably such that some of the material of at least one of the lobes can enter one of the flutes to effect the mechanical thread lock. In a presently preferred embodiment, five flutes are provided in the pin with three lobes provided on the nut.

The pin is illustrated in greater detail in FIGS. 2 and 3. Pin 12 includes a shank 30 that is received in aligned holes 32 in the workpiece. One end 36 of the shank is threaded for receiving the threads of the nut 14, and the other end of the shank has a head 34, which bears on an exposed surface of the workpiece to develop an axial load on the workpiece in cooperation with the nut. The head is arbitrarily illustrated without a wrenching surface, although other conventional pin heads may be used, such as hexagonal or countersunk heads.

To prevent rotation of the pin 12, recess 39 is provided in the end face 41 of the threaded end 36 of the pin to receive the tool 16, which holds the pin stationary while the driver turns to torque the nut. In the embodiment illustrated in FIGS. 2 and 3, the recess 39 includes splines 40a–f equally spaced around the circumference of the recess. The splines may be formed in the pin by any suitable means, and are preferably machined into the end face of the threaded end of the pin. Preferably, the recess 39 is contained entirely within the existing pin length of the fastener so that it is not necessary to add any material protruding from the end face 41 of the threaded end 36 of the pin. Additionally, the depth of the recess is preferably such that a minimal amount of material will be removed from the lead-in or imperfect thread zone of the pin. For example a recess depth between 0.090 inch and 0.095 inch is acceptable.

The recess 39, also referred to herein as a wrenching socket, includes the splines 40a–f having a geometry similar to wrenching sockets known as a "spline drive". The recess 39 has been substantially modified in order to balance the shear strength of the wrenching tool 16 with the shear strength of the fastener material. The wrenching socket 39 of the present invention has been designed to include spline widths and shear areas of both the socket and the wrenching tool to a level that closely approximates equality of torsional loading. This design increases the strength particularly when the fastener material possesses low strength. Another novel feature of the splines 40a–f is that the ends 42 of the splines are curved to accommodate a curved minor diameter 28 (See FIG. 4) of the wrenching tool 16.

Figure 4:
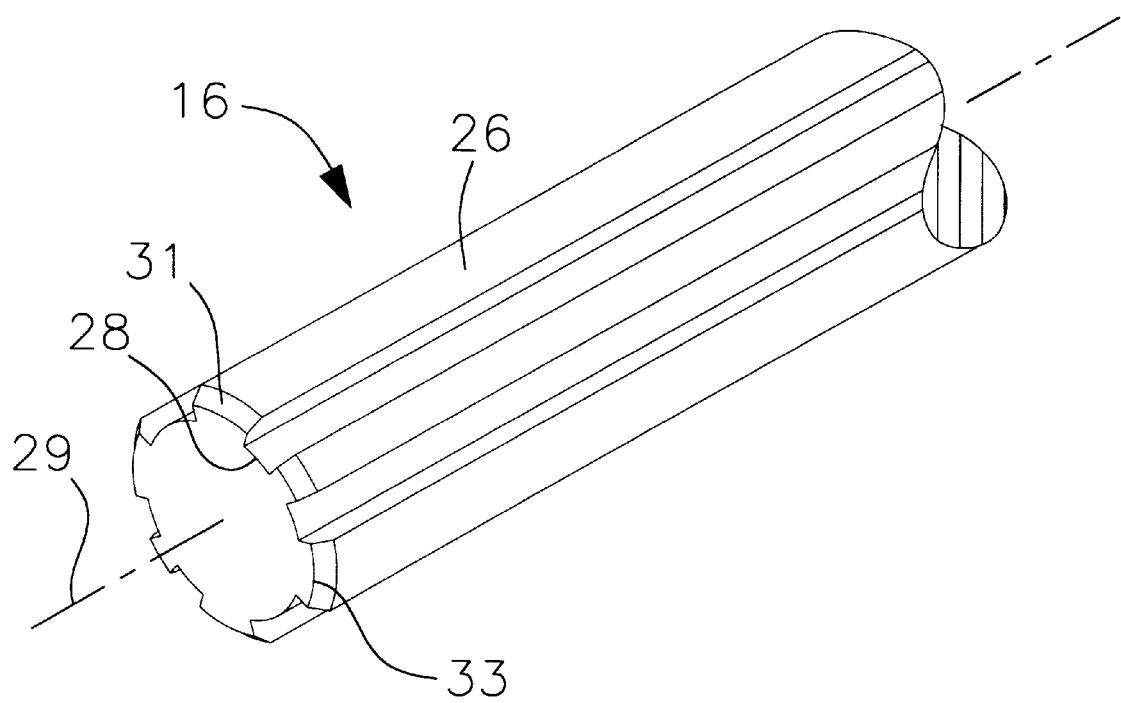
FIG. 4 is a perspective view of the bit of FIG. 1.

During setting of the fastener, the recess 39 receives and engages the tool 16 to prevent rotation of the pin 12 as the nut 14 is torqued on by the driver 18. The tool 16 may be attached to a power tool for rapid installation of the fasteners, or may be used during hand installation of the fasteners. The tool 16 of which one embodiment is illustrated in FIGS. 1 and 4. The tool comprises a solid, cylindrical shaft 24 with a plurality of splines 26 extending along the shaft. As seen best in FIG. 4, six equally-spaced splines are located around the circumference of the shaft, parallel to the longitudinal axis 29 of the shaft. The splines preferably are all the same size. The splines 26 of the tool 16 are received within the matching splines 40a–f of the recess 39. As the nut is torqued on by the driver, the matching configurations of the tool and the recess engage one another to prevent the pin from rotating. In a presently preferred embodiment, the tool 16 includes a beveled edge 31 on a leading edge 33 of the tool to facilitate the insertion of the tool into the recess 39. Although the tool is shown with a powered driver in FIG. 1, it is to be understood that the tool can be used manually in a hand held form.

The driving splines 26 are calculated to reduce the shear area so that it is in close balance strengthwise with the wrenching socket's shear area. The net result is a substantial increase in torsional performance, because the driving tool does not overpower the socket. In addition the minor diameter 28 of the tool 16 has a curved surface. Prior spline driving tools included a minor diameter which was flat causing the loss of valuable torsional strength because material was removed to create the flat surface. By having a curved minor diameter, the torsional strength of the tool is increased due to the additional material. In comparison, the spline width of the driving tool is less than the spline width of the socket. All of these designs changes have improved the torsion values of the fastener. Improved torsional capability of the wrenching socket and the maximumization of the torsional performance is particularly important when used in lower strength materials and minimum socket depth.

Various modifications and variations of the invention described herein will be apparent to those skilled in the art For example, the recess although preferably located in the threaded end, can be located in the head of the fastener for other types of installation procedures. Additionally the recess and driver can be used for other types of fasteners. For such reasons, it will be understood that, within the scope of the appended claims, the invention may be practiced otherwise than as specifically described.

What is claimed is:

1. A fastener comprising:

a nut; and a pin having a shank, a threaded portion on the shank, an end face on the threaded portion of the shank, and a recess in the end face, wherein the recess comprises a plurality of splines spaced around a circumference of the recess, the splines having a width greater than a space between adjacent splines and a concave end surface, and wherein the nut is torqued onto the pin.

2. The fastener according to claim 1 wherein there are six splines.

3. The fastener according to claim 2 wherein the pin further comprises a plurality of flutes extending in an axial direction across the threaded portion of the pin.

4. The fastener according to claim 1 wherein the nut comprises at least one external, axially extending lobe.

5. A tool for use in a fastener system, the tool comprising:

a shaft;

a plurality of splines spaced around the circumference of the shaft, the splines having a width less than a space between adjacent splines; and a convex minor diameter located between the splines formed to match an end spline surface of a fastener.

6. The tool according to claim 5 wherein there are six splines equally spaced on the shaft.

7. The tool according to claim 5 wherein at least one of the plurality of splines further comprises a leading edge surface having a beveled edge.

8. A fastener system for exhibiting increased torsional capability during installation of a fastener, the fastener system comprising:

a tool including a shaft, a plurality of splines extending around a circumference of the shaft;

a nut; and a pin having a shank, a threaded portion on the shank for receipt of the nut, an end face on the threaded portion of the shank, and a recess in the end face, wherein the recess includes a plurality of splines having a width greater than a space between adjacent splines positioned around a circumference of the recess, and wherein the recess is configured to receive the splines of the tool when the nut is torqued onto the pin to balance a shear strength of the tool with a shear strength of the pin.

9. The fastener system according to claim 8 wherein the pin further comprises a plurality of flutes extending in an axial direction across the threaded portion of the pin.

10. The fastener system of claim 8 wherein an end of the recess splines and a minor diameter of the tool have a matching curved surface.

* * * * *